(12) United States Patent
Hoekman et al.

(10) Patent No.: US 11,442,221 B2
(45) Date of Patent: Sep. 13, 2022

(54) MULTIVIEW DISPLAY ALIGNMENT METHOD AND SYSTEM

(71) Applicant: LEIA INC., Menlo Park, CA (US)

(72) Inventors: Thomas Hoekman, Menlo Park, CA (US); David A. Fattal, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/481,126

(22) Filed: Sep. 21, 2021

(65) Prior Publication Data

US 2022/0003918 A1 Jan. 6, 2022

Related U.S. Application Data

(63) Continuation of application No. PCT/US2020/026430, filed on Apr. 2, 2020.
(Continued)

(51) Int. Cl.
*F21V 8/00* (2006.01)
*G06V 10/98* (2022.01)

(52) U.S. Cl.
CPC ........... *G02B 6/0086* (2013.01); *G06V 10/98* (2022.01); *G02B 6/005* (2013.01)

(58) Field of Classification Search
CPC ...... G02B 6/0086; G02B 6/005; G06V 10/98; G02F 1/1323; G02F 1/133308; G02F 1/133604; G02F 1/133608
See application file for complete search history.

(56) References Cited

U.S. PATENT DOCUMENTS 9,128,226 B2 9/2015 Fattal et al.
9,201,270 B2 12/2015 Fattal et al.
(Continued)

FOREIGN PATENT DOCUMENTS

JP 2009300816 A 12/2009
KR 10-2014-0079101 A 6/2014
(Continued)

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
(Continued)

*Primary Examiner* — Donald L Raleigh
(74) *Attorney, Agent, or Firm* — J. Michael Johnson

(57) ABSTRACT

A method of aligning a multiview backlight with a light valve array of a multiview display employs an alignment pattern that includes unit cells spaced apart from one another and having view blocks corresponding to different views of the multiview display. The method of aligning includes establishing the alignment pattern on the light valve array, illuminating the light valve array using the multiview backlight to display the alignment pattern, and adjusting a relative position of the multiview backlight and the light valve array to minimize an error measure of the unit cells within the displayed alignment pattern. A multiview display backlight alignment system includes the multiview display and a positioning stage configured to adjust the relative position to minimize the error measure. An automated multiview display backlight alignment system further includes a feedback controller, the positioning stage being motorized.

22 Claims, 8 Drawing Sheets

Related U.S. Application Data

(60) Provisional application No. 62/828,398, filed on Apr. 2, 2019.

(56) References Cited

U.S. PATENT DOCUMENTS

| | | | |
|---|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |
| 10,551,546 B2 | 2/2020 | Fattal |
| 10,649,128 B2 | 5/2020 | Fattal et al. |
| 10,705,281 B2 | 7/2020 | Fattal et al. |
| 10,798,371 B2 | 10/2020 | Fattal |
| 10,802,212 B2 | 10/2020 | Fattal |
| 10,802,443 B2 | 10/2020 | Fattal |
| 10,810,917 B2 | 10/2020 | Fattal |
| 10,830,939 B2 | 11/2020 | Fattal et al. |
| 10,838,134 B2 | 11/2020 | Fattal et al. |
| 10,884,175 B2 | 1/2021 | Fattal |
| 10,928,564 B2 | 2/2021 | Fattal |
| 10,928,677 B2 | 2/2021 | Aieta et al. |
| 10,969,627 B2 | 4/2021 | Fattal et al. |
| 11,004,407 B2 | 5/2021 | Fattal et al. |
| 11,016,235 B2 | 5/2021 | Fattal et al. |
| 11,041,988 B2 | 6/2021 | Fattal et al. |
| 11,048,036 B2 | 6/2021 | Ma et al. |
| 2007/0018585 A1 | 1/2007 | Ijzerman et al. |
| 2009/0322986 A1 | 12/2009 | Wei et al. |
| 2012/0200807 A1 | 8/2012 | Wei et al. |
| 2013/0169518 A1 | 7/2013 | Wu et al. |
| 2014/0168390 A1 | 6/2014 | Cho et al. |
| 2015/0077526 A1 | 3/2015 | Kim et al. |
| 2016/0033705 A1 | 2/2016 | Fattal |
| 2016/0349524 A1 | 12/2016 | Pijlman et al. |
| 2017/0192244 A1 | 7/2017 | Shinohara et al. |
| 2017/0363794 A1 | 12/2017 | Wan et al. |
| 2019/0018186 A1 | 1/2019 | Fattal |
| 2019/0302336 A1 | 10/2019 | Fattal et al. |
| 2020/0018891 A1 | 1/2020 | Fattal et al. |
| 2020/0033526 A1 | 1/2020 | Fattal et al. |
| 2020/0033621 A1 | 1/2020 | Fattal et al. |
| 2020/0301165 A1 | 9/2020 | Fattal |
| 2020/0310135 A1 | 10/2020 | Fattal |
| 2021/0157050 A1 | 5/2021 | Fattal |
| 2021/0255476 A1 | 8/2021 | Fattal |

FOREIGN PATENT DOCUMENTS

| | | |
|---|---|---|
| KR | 10-2015-0031626 A | 3/2015 |
| WO | 2012038856 A1 | 3/2012 |
| WO | 2018186955 A1 | 10/2018 |
| WO | 2020190341 A1 | 9/2020 |
| WO | 2021076114 A1 | 4/2021 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

International Search Report and Written Opinion (ISRWO) by International Searching Authority (ISA) Korean Intellectual Property Office (KIPO) dated Jul. 13, 2020 (12 pages) for foreign counterpart parent International Application No. PCT/US2020/026430.

MULTIVIEW DISPLAY ALIGNMENT METHOD AND SYSTEM

CROSS-REFERENCE TO RELATED APPLICATIONS

This application is a continuation application of and claims the benefit of priority to International Patent Application No. PCT/US2020/026430, filed Apr. 2, 2020, which claims the benefit of priority to U.S. Provisional Patent Application Ser. No. 62/828,398, filed Apr. 2, 2019, the entirety of each of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

Present techniques for aligning components of such displays during manufacture often involve utilizing a microscope to align marks on a light producing portion (e.g., backlight, film, etc.) with marks on the display panel to properly align the components during assembly. Drawbacks of such techniques, however, include the requirement of a very high degree of precision in tooling (e.g., given sizes of the microscope stage, tightness of the mechanical tolerances on telecentric lenses, etc.), the limitation of the alignment operation to the field of view of the microscope, and the inability to detect certain misalignment such as inter-mark local distortions.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
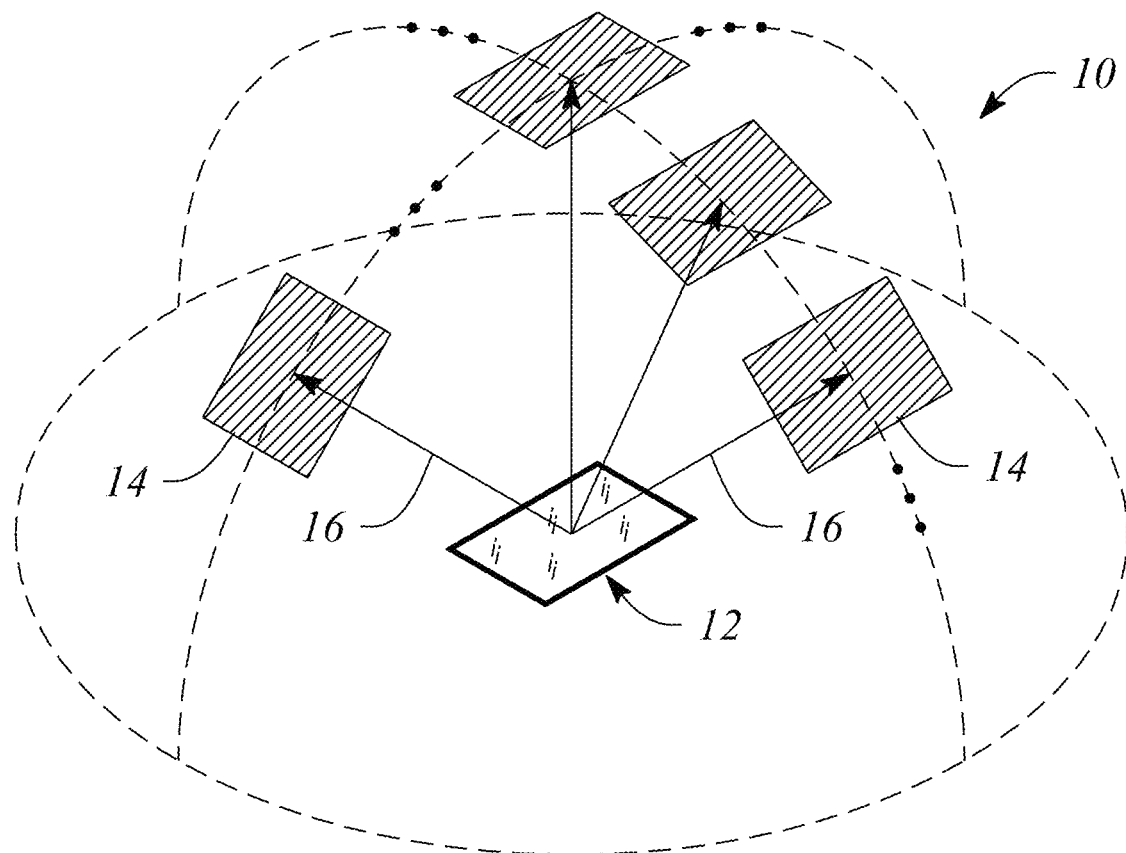
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a method of aligning a multiview backlight with a light valve array of a multiview display as well as a multiview display backlight alignment system. In particular, in accordance with the principles described herein, a method of aligning a multiview backlight with a light valve array may provide alignment using an alignment pattern displayed on or by the light valve array while illuminated by the multiview backlight. According to various embodiments, the alignment pattern comprises a plurality of unit cells spaced apart from one another, with each unit cell comprising a plurality of view blocks having different view directions corresponding to different views of the multiview display. In addition, an arrangement of the view blocks within the unit cell corresponds to an arrangement of the different views of the multiview display, in some embodiments. By using the displayed alignment pattern, a relative position of the multiview backlight and light valve array may be adjusted to minimize an error measure determined from the displayed alignment pattern to provide precise alignment. Since the alignment method described herein employs the displayed alignment pattern, there is no need for other, optical alignment marks. Moreover, the alignment of the multiview backlight and light valve array may be automated in a multiview display backlight alignment system, according to some embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. For example, the multiview display described herein may be employed to present images and similar information in conjunction with a so-called 'glasses-free' or autostereoscopic display system, according to various embodiments. Uses of multiview displays described herein include, but are not limited to, mobile telephones (e.g., smart phones), watches, tablet computers, mobile computers (e.g., laptop computers), personal computers and computer monitors, automobile display consoles, cameras displays, and various other mobile as well as substantially non-mobile display applications and devices.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16). Only four views 14 and four view directions 16 are illustrated in FIG. 1A, all by way of example and not limitation. Also, while the different views 14 are illustrated in FIG. 1A as being above the screen, the views 14 actually appear on or in a vicinity of the screen 12 when the multiview image is displayed on the multiview display 10. Depicting the different views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
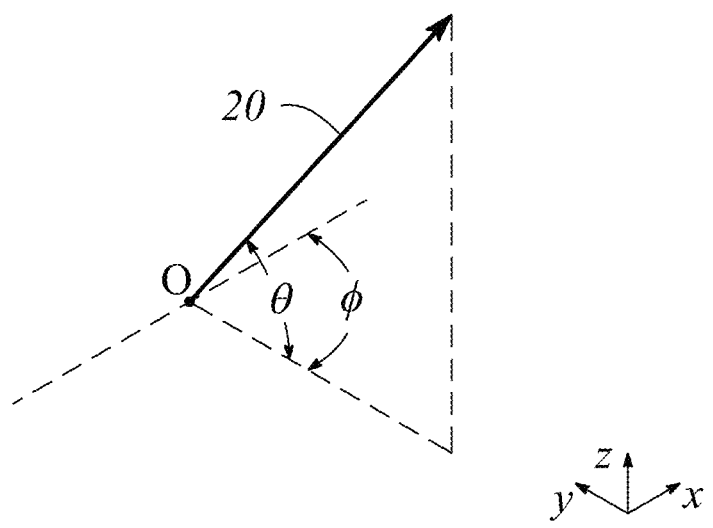
FIG. 1B illustrates a graphical representation of the angular components of a light beam having a particular principal angular direction in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Figure 1C:
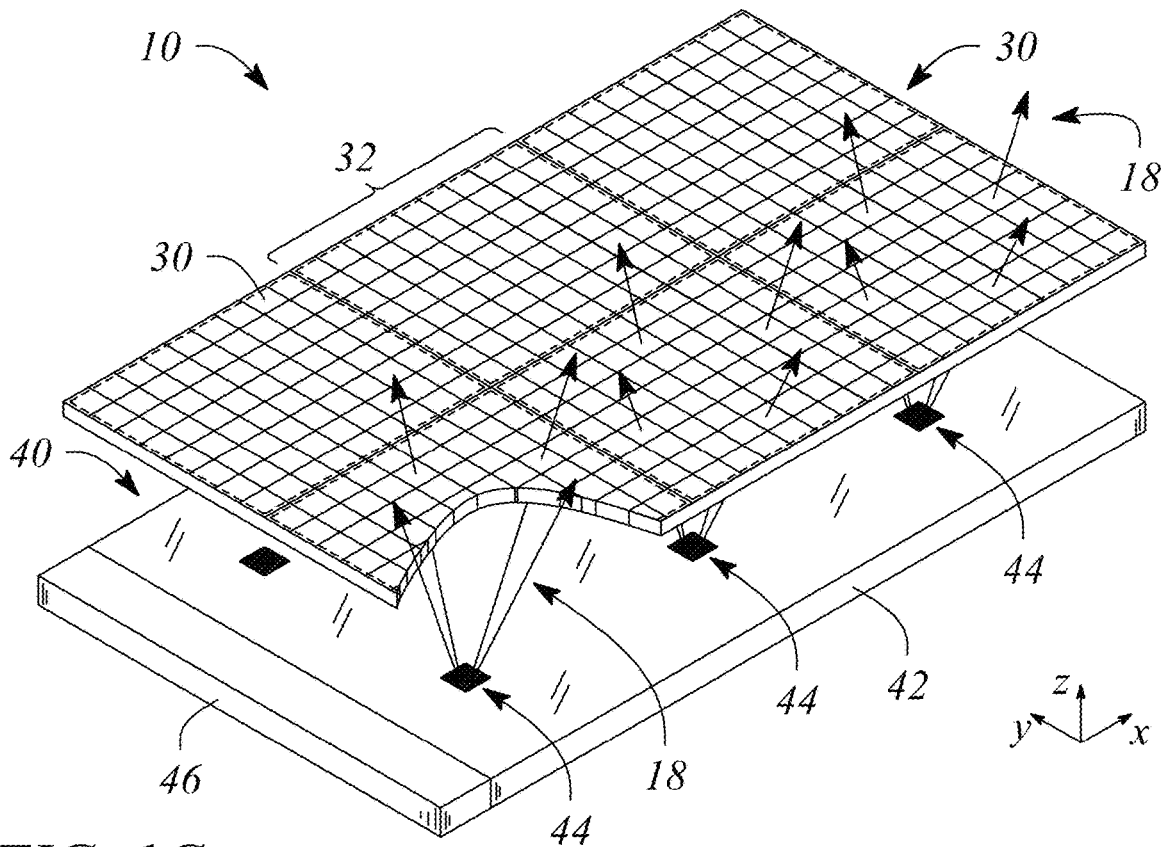
FIG. 1C illustrates a perspective view of a multiview display in an example, according to an embodiment consistent with the principles described herein.

FIG. 1C illustrates a perspective view of a multiview display 10 in an example, according to an embodiment consistent with the principles described herein. According to various embodiments, the multiview display 10 is configured to provide or emit light (e.g., directional light beams) as emitted light 18, that when modulated, may represent the multiview image having the different views 14 in the different view directions 16, as illustrated.

As illustrated, the multiview display 10 comprises an array of light valves 30 and a multiview backlight 40. The multiview backlight 40 is configured to emit light as directional light beams to illuminate light valves 30 of the light valve array. In turn, the light valves 30 of the light valve array are configured to modulate the light emitted to provide the multiview image. In various embodiments, different types of light valves may be employed as the light valves 30 of the light valve array including, but not limited to, one or more of liquid crystal light valves, electrophoretic light valves, and light valves based on electrowetting. For example, the light valve array may comprise a plurality of liquid crystal light valves and the light valve array may be a liquid crystal display (LCD) panel. Note that light valves are sometimes referred to as 'cells' or 'pixels' of the multiview display 10. As such and by definition herein, the terms 'light valve' 'pixel' and 'cell' may be used interchangeably to mean the same thing.

According to some embodiments (e.g., as illustrated), the multiview backlight 40 may comprise a light guide 42 configured to guide light from a light source and an array of multibeam elements 44 configured to scatter out portions of the guided light as directional light beams representing the emitted light 18 and having directions corresponding to the view directions 16 of the different views of the multiview display 10. In particular, each multibeam element 44 of the multibeam element array is configured to scatter out a portion of the guided light from the light guide 42 as a plurality of directional light beams having directions corresponding to the different view directions 16, according to various embodiments. Arrows in FIG. 1C illustrate directional light beams of the emitted light 18 that is scattered out from the light guide 42 by the multibeam elements 44, by way of example and not limitation. FIG. 1C also illustrates multiview pixels 32 associated with the multibeam elements 44 using dashed lines to surround subsets of light valves 30 of the light valve array. In other embodiments (not illustrated), the multiview backlight 40 may comprise a parallax barrier or another structure configured to provide the directional light beams.

In some embodiments, a size of the multibeam elements 44 of the multiview backlight 40 may be between twenty five percent (25%) and two hundred percent (200%) of a size of a light valve of the array of light valves 30. Further, a spacing between adjacent multibeam elements of the multibeam element array may be commensurate with a spacing between adjacent multiview pixels 32 of the multiview display 10. For example, an inter-emitter distance (e.g., center-to-center distance) between a pair of adjacent multibeam elements may be equal to an inter-pixel distance (e.g., a center-to-center distance) between a corresponding adjacent pair of multiview pixels 32, e.g., represented by sets of light valves 30 of the light valve array.

According to various embodiments, the multibeam elements 44 of the multiview backlight 40 may comprise any of a number of different structures configured to scatter out a portion of the guided light from the light guide 42. For example, the different structures may include, but are not limited to, diffraction gratings, micro-reflective elements, micro-refractive elements, or various combinations thereof. In particular, the multibeam element array comprise one or more of a diffraction grating configured to diffractively scatter out the guided light, a micro-reflective element configured to reflectively scatter out the guided light, and a micro-refractive element configured to refractively scatter out the guided light.

In some embodiments (e.g., as illustrated), the multiview backlight 40 further comprises a light source 46. The light source 46 may be coupled to an edge of the light guide 42, as illustrated, and is configured to provide light to be guided by the light guide 42 as the guided light. In some embodiments, the light source 46 is configured to one or both provide light to be guided at non-zero propagation angle and provide light to be guided according to a predetermined collimation factor as collimated guided light. For example, the light source 46 may comprise a collimator, in some embodiments. In some embodiments, the collimation factor of the collimated guided light may determine a spread angle of the plurality of directional light beams scattered out by the multibeam elements 44 of the multiview backlight 40, i.e., the multibeam elements 44 may comprise angle-preserving scattering elements, for example.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. Any of a variety of optically transparent materials may be employed in the light guide including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality, by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

A 'multiview pixel' is defined herein as a set of pixels representing 'view' pixels in each of a similar plurality of different views of a multiview display. In particular, a multiview pixel may have an individual pixel corresponding to or representing a view pixel in each of the different views of the multiview image. Moreover, the pixels of the multiview pixel are so-called 'directional pixels' in that each of the pixels is associated with a predetermined view direction of a corresponding one of the different views, by definition herein. Further, according to various examples and embodiments, the different view pixels represented by the pixels of a multiview pixel may have equivalent or at least substantially similar locations or coordinates in each of the different views. For example, a first multiview pixel may have individual pixels corresponding to view pixels located at $\{x_1, y_1\}$ in each of the different views of a multiview image, while a second multiview pixel may have individual pixels corresponding to view pixels located at $\{x_2, y_2\}$ in each of the different views, and so on.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display, may facilitate a perception of depth and thus appear to be an image of a 3D scene to a viewer, for example.

Embodiments consistent with the principles described herein may be implemented using a variety of devices and circuits including, but not limited to, one or more of integrated circuits (ICs), very large scale integrated (VLSI) circuits, application specific integrated circuits (ASIC), field programmable gate arrays (FPGAs), digital signal processors (DSPs), graphical processor unit (GPU), and the like, firmware, software (such as a program module or a set of instructions), and a combination of two or more of the above. For example, an embodiment or elements thereof may be implemented as circuit elements within an ASIC or a VLSI circuit. Implementations that employ an ASIC or a VLSI circuit are examples of hardware-based circuit implementations.

In another example, an embodiment may be implemented as software using a computer programming language (e.g., C/C++) that is executed in an operating environment or a software-based modeling environment (e.g., MATLAB®, MathWorks, Inc., Natick, Mass.) that is further executed by a computer (e.g., stored in memory and executed by a processor or a graphics processor of a general purpose computer). Note that one or more computer programs or software may constitute a computer-program mechanism, and the programming language may be compiled or interpreted, e.g., configurable or configured (which may be used interchangeably in this discussion), to be executed by a processor or a graphics processor of a computer.

In yet another example, a block, a module or an element of an apparatus, device or system (e.g., image processor, camera, etc.) described herein may be implemented using actual or physical circuitry (e.g., as an IC or an ASIC), while another block, module or element may be implemented in software or firmware. In particular, according to the definitions herein, some embodiments may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

In accordance with some embodiments of the principles described herein, a method of aligning a multiview backlight with a light valve array of a multiview display is provided. Such method may be performed, for example, during one or both of assembly of a multiview display and quality control of an assembled multiview display. For example, the method of aligning may facilitate aligning the array of light valves 30 and the multiview backlight 40 of the multiview display 10, illustrated above by way of example in FIG. 1C.

Figure 2:
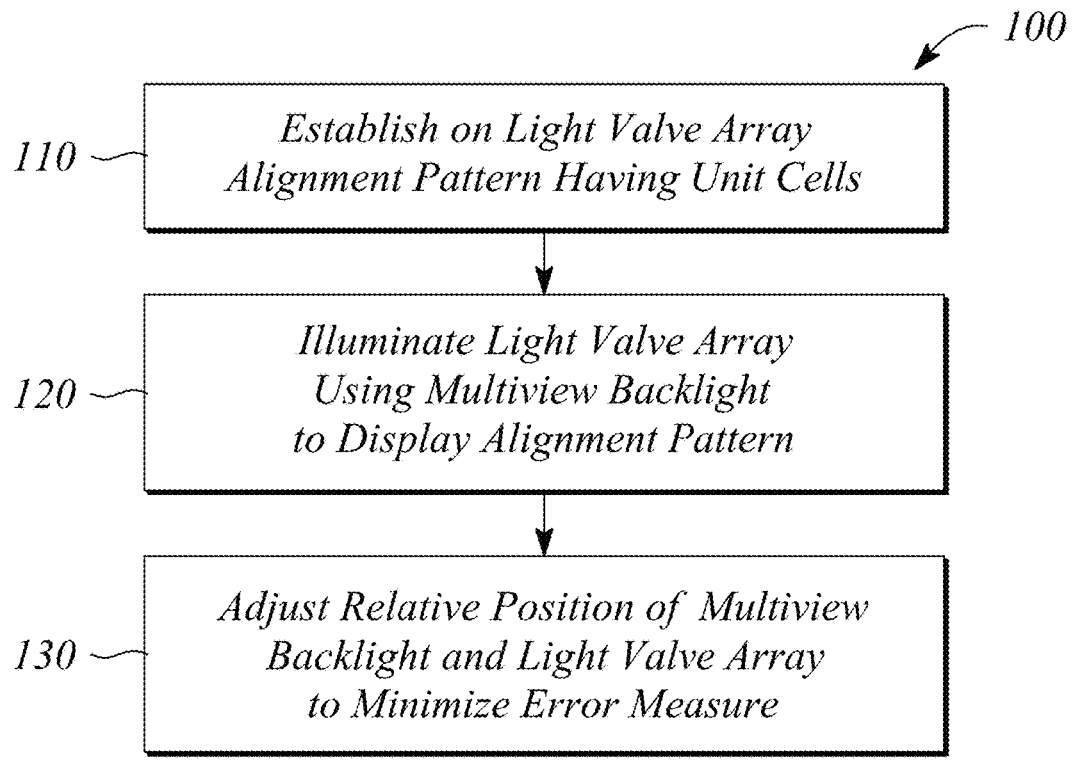
FIG. 2 illustrates a flow chart of a method of aligning a multiview backlight with a light valve array of a multiview display in an example, according to an embodiment consistent with the principles described herein.

FIG. 2 illustrates a flow chart of the method 100 of aligning a multiview backlight with a light valve array of a multiview display in an example, according to an embodiment consistent with the principles described herein. As illustrated, the method 100 of aligning a multiview backlight with a light valve array of a multiview display comprises establishing 110 on the light valve array an alignment pattern having unit cells spaced apart from one another. Each unit cell of the alignment pattern comprises a plurality of view blocks having different view directions corresponding to different views of the multiview display. According to various embodiments, an arrangement of view blocks within each unit cell corresponds to an arrangement of the views of the multiview display. Further, the alignment pattern may comprise a plurality of unit cells distributed across the light valve array of the multiview display, e.g., as an array of spaced-apart unit cells. The unit cells may be distributed to substantially cover an extent or an entire area of the multiview display or light valve array thereof, for example.

By definition herein, a 'view block' is a subset of light valves or pixels of the light valve array. The subset of pixels representing a view block may comprise a plurality of contiguous light valves, for example. Further by definition, the view block has a view direction corresponding to a view direction of the multiview view display or equivalently of a multiview image of the multiview display. That is, the pixels or light valves that make up the view block are configured to selectively pass directional light beams having a direction that corresponds to the view direction of the view block. For example, certain light valves of the light valve subset representing the view block may be turned on or opened to allow directional light beams having directions corresponding to the view direction of the view block to pass through the light valves. Simultaneously, other light valves of the light valve subset representing the view block are turned off or closed to block directional light beams having other directions. As a result, the view block emits light only in the direction corresponding to the view direction of the view block and not in other directions, e.g., not in directions corresponding to other view directions of the multiview display.

Further, a 'unit cell' of the alignment pattern is defined as a collection, a group, or a plurality of view blocks, where each view of the multiview display is represented by a different one of the view blocks of the unit cell. That is, a unit cell comprises a view block corresponding to each view of the multiview display, by definition herein. Moreover, an arrangement of the view blocks within the unit cell corresponds to an arrangement of views of the multiview display. For example, if the multiview display has a four-by-four (4×4) arrangement of different views, the unit cell would have a similar 4×4 arrangement of view blocks, each one of which represented a different view of the 4×4 arrangement of views, i.e., the unit cell would have sixteen (16) different view blocks represent the 16 different views and arranged in a 4×4 array. In another example, the multiview display may provide eight (8) different views arranged in an eight-by-one (8×1) array or pattern. The unit cell would then have an 8×1 arrangement of 8 different view blocks, each of the 8 different view blocks representing or providing emitted light in a direction corresponding to the 8 different views. In some embodiments, the view blocks of or within a unit cell are contiguous to one another.

Accordingly, establishing 110 on the light valve array the alignment pattern may comprise selectively turning on or turning off light valves of the light valve array to provide the different view blocks of various unit cells of the alignment pattern. In some embodiments, the arrangement of views of the multiview display may comprise a one-dimensional (1D) array of sequentially arranged views. As such, each unit cell of the alignment pattern has a corresponding 1D array of sequentially arranged view blocks. For example, the 1D array of views may be four (4) views arranged sequentially in a four-by-one (4×1) array and the unit cell may have 4 view blocks representing the 4 views and arranged in a 4×1 sequential arrangement. In another example, there may be eight (8) views arranged in an eight-by-one (8×1) array (e.g., view 1, view 2, . . . , view 8) and the 1D array of view blocks in the unit cell may be an 8×1 sequential array.

In other embodiments, the arrangement of views of the multiview display may comprises a two-dimensional (2D) array of views. In these embodiments, each unit cell of the alignment pattern has a corresponding 2D array of view blocks representing each of the different views or view directions of the multiview display. For example, the 2D array of views may be a two-by-two (2×2) array of four views arranged in two rows and two columns. The unit cell would then have a corresponding 2×2 array of view blocks. In another example, the 2D array may be a four-by-four (4×4) array of sixteen views and the unit cell would include a similar 4×4 array of sixteen corresponding view blocks.

Figure 3A:
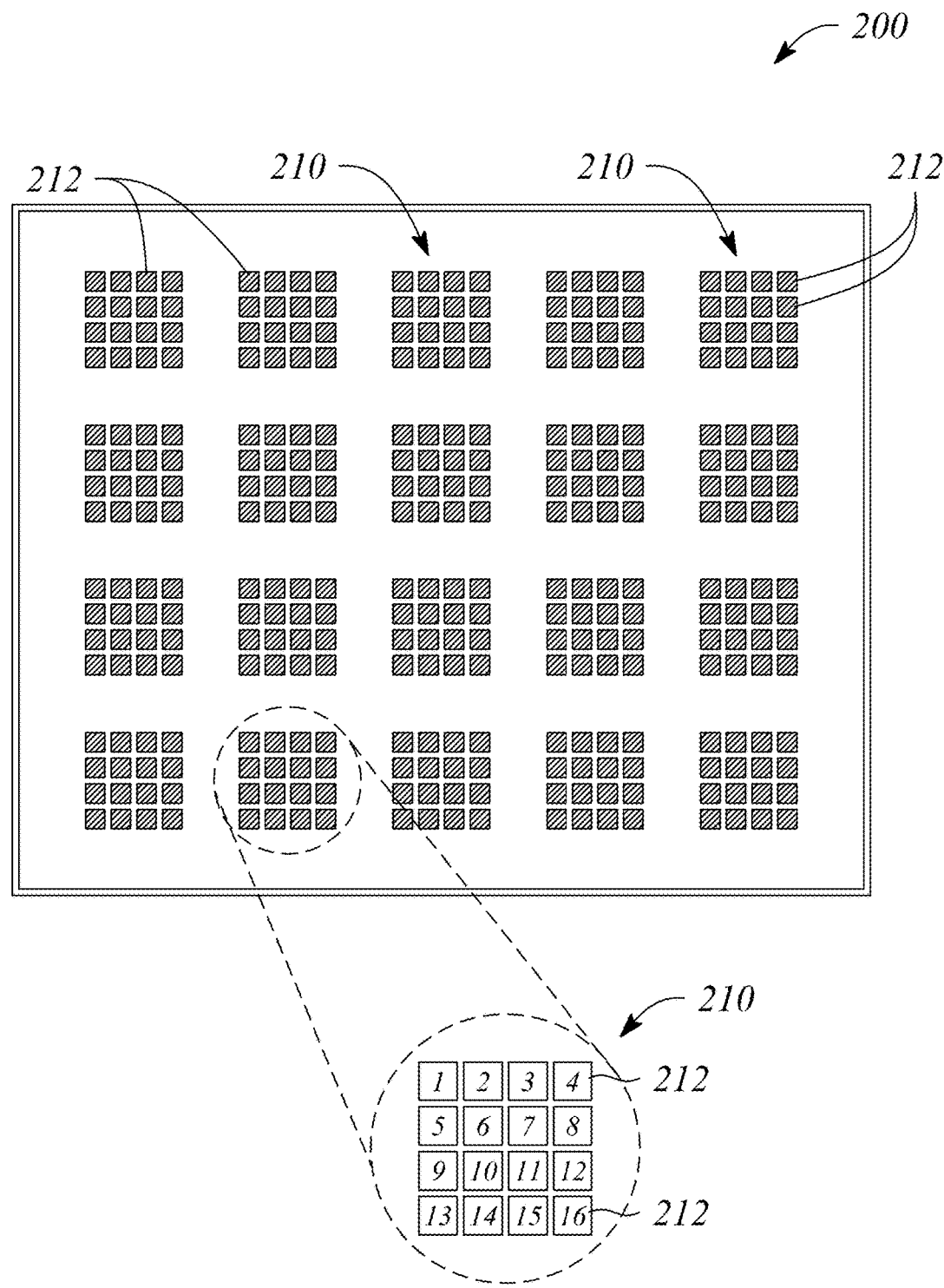
FIG. 3A illustrates a plan view of an alignment pattern in an example, according to an embodiment consistent with the principles described herein.
Figure 3B:
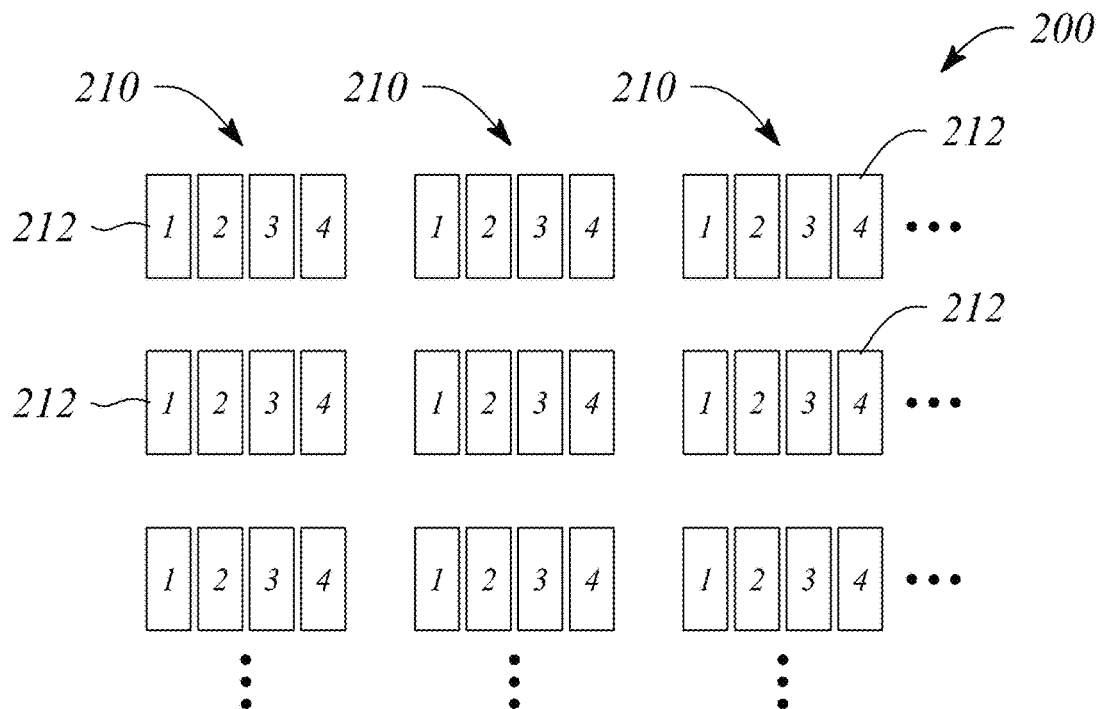
FIG. 3B illustrates a plan view of an alignment pattern in an example, according to another embodiment consistent with the principles described herein.
Figure 3C:
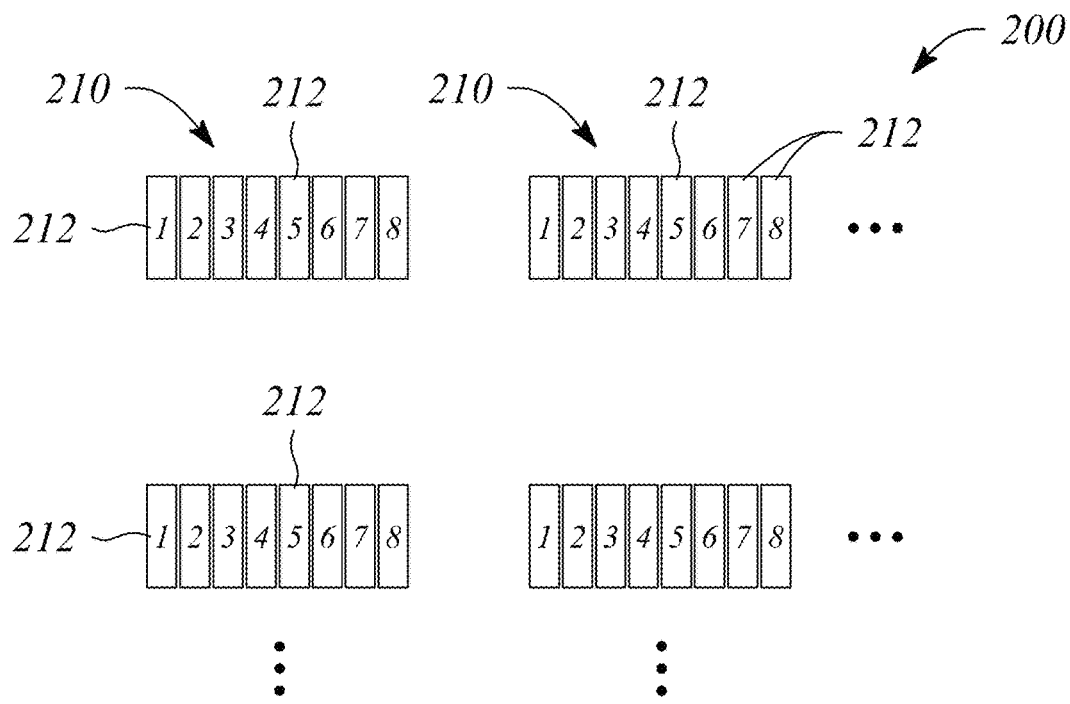
FIG. 3C a plan view of an alignment pattern in an example, according to another embodiment consistent with the principles described herein.

FIG. 3A illustrates a plan view of an alignment pattern 200 in an example, according to an embodiment consistent with the principles described herein. FIG. 3B illustrates a plan view of an alignment pattern 200 in an example, according to another embodiment consistent with the principles described herein. FIG. 3C a plan view of an alignment pattern 200 in an example, according to another embodiment consistent with the principles described herein. As illustrated, each of the alignment patterns 200 comprises unit cells 210 and each unit cell 210 comprises a plurality of view blocks 212. Further, as described above, the view blocks 212 each comprise a subset of light valves or pixels of a light valve array that are selectively activated or deactivated to provide emitted light in a direction corresponding to a view direction of the view blocks 212. The light valve array is illustrated by a border around the alignment pattern 200 in FIGS. 3A-3C. However, individual light valves of the light valve array are not illustrated in FIG. 3A-3C, for ease of illustration, the individual light valves are generally much smaller than the view blocks 212.

FIG. 3A illustrates unit cells 210 having a 2D array of view blocks 212 in a four-by-four (4×4) arrangement. By way of example, view numbers are identified in view blocks 212 of a magnified, example unit cell 210 to illustrate correspondence to the different views of the multiview display that are represented by the view blocks 212 in FIG. 3A. Further, as illustrated in FIG. 3A, the unit cells 210 of the alignment pattern 200 are spaced apart from one another as well as being distributed across a substantial portion or extent of the light valve array upon which the alignment pattern 200 is established.

FIGS. 3B and 3C illustrate 1D arrays of view blocks 212. In particular, a 1D array comprising a four-by-one (4×1) arrangement of view blocks 212 in each of the illustrated unit cells 210 of the alignment pattern 200 is illustrated in FIG. 3B. FIG. 3C depicts an eight-by-one (8×1) arrangement of the view blocks 212 in each unit cell 210 of the illustrated alignment pattern 200. View blocks 212 in the unit cell 210 in each of FIGS. 3B and 3C are numbered to illustrate correspondence of the view blocks 212 to views of a multiview display, by way of example and not limitation.

In other embodiments (not illustrated), the view blocks 212 may not be arranged within the unit cells 210 in a manner corresponding to the views of the multiview display. However, each unit cell 210 still have a different view block 212 corresponding to each of the views, according to various embodiments. Note that a 1D arrangement of views may be used in a so-called horizontal parallax-only multiview display, while a 2D arrangement of views may correspond to a so-called full parallax multiview display, for example. Also note that the 2D arrangement of views and the corresponding 2D arrangement of view blocks 212 need not have the same number of views in two orthogonal directions, e.g., the 2D arrangement may be 4×2 or 5×3, 2×4, or just about any other arrangement.

Figure 4A:
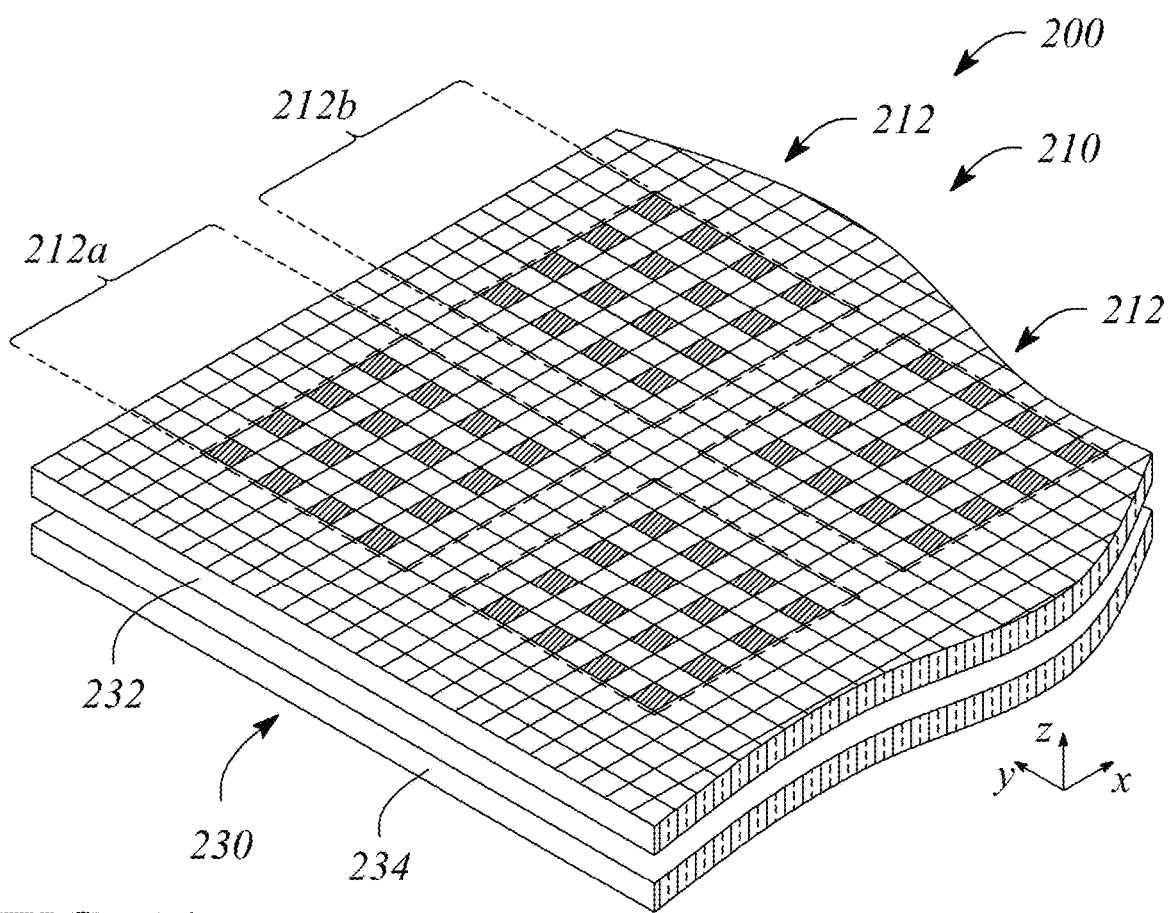
FIG. 4A illustrates a perspective view of a portion of a multiview display in an example, according to an embodiment consistent with the principles described herein.
Figure 4B:
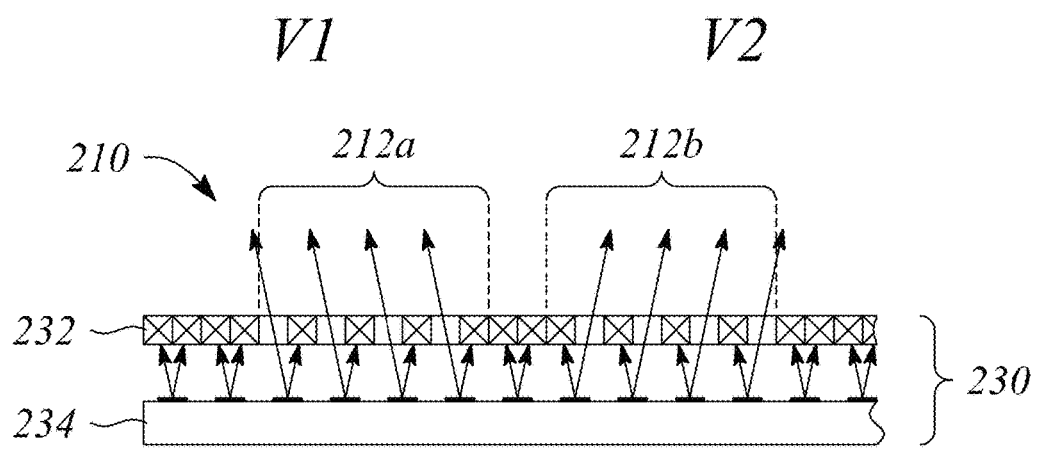
FIG. 4B illustrates a cross sectional view of the multiview display portion of FIG. 4A in an example, according to an embodiment consistent with the principles described herein.

FIG. 4A illustrates a perspective view of a portion of a multiview display 230 in an example, according to an embodiment consistent with the principles described herein. FIG. 4B illustrates a cross sectional view of the multiview display portion of FIG. 4A in an example, according to an embodiment consistent with the principles described herein. As illustrated, the multiview display 230 comprises an array of light valves 232 and a multiview backlight 234. In some embodiments, multiview display 230, the light valve array, and the multiview backlight 234 may be substantially similar the above-described multiview display 10, array of light valves 30, and multiview backlight 40, respectively.

FIGS. 4A and 4B also illustrate the light valve array configured to display an alignment pattern 200 with a unit cell 210 having a 2×2 arrangement of view blocks 212, by way of example and not limitation. As illustrated, each of the view blocks 212 of the unit cell 210 in FIGS. 4A-4B comprise a plurality of light valves 232 of the light valve array configured to pass light corresponding to a different one of four (4) different views of the multiview display 230. In particular, FIG. 4A, illustrates activated or open light valves 232 within each of the unit cells 210 using cross hatching, while inactivated or closed light valves that block light in each of the unit cells 210 and are depicted without cross hatching. FIG. 4B illustrates inactivated or closed light valves 232 using an "X" and open or activated light valves 232 without an "X".

As illustrated, each of the view blocks 212 includes a different set of activated and inactivated light valves, the different sets corresponding to the different views of the multiview display 230. For example, a first view block 212a of the unit cell 210 may be configured to pass light corresponding to or in a direction of a first view V1 of the multiview display 230 and a second view block 212b may be configured to pass light corresponding to or in a direction of a second view V2 of the multiview display 230, e.g., as illustrated. Similarly, the other view blocks 212 may be configured to pass light corresponding to or in a direction of other views, e.g., a third view V3 and a fourth view V4, for example.

FIG. 4B also illustrates light emitted by the multiview backlight 234 as arrows representing directional light beams. The directional light beams may be emitted by multibeam elements, for example, as described above. As illustrated in FIG. 4B, directional light beams having a direction corresponding to the first view V1 pass through activated or open light valves 232 within the first view block 212a. Other directional light beams having a direction corresponding to the second view V2 are blocked by inactivate or closed light valves 232 within the first view block 212a, also as illustrated. Further, as illustrated in FIG. 4B, directional light beams having a direction corresponding to the second view V2 pass through activated or open light valves 232 within the second view block 212b, while other directional light beams having a direction corresponding to the first view V1 are blocked by inactivate or closed light valves 232 of the light valve array.

Referring again to FIG. 2, the method 100 of aligning a multiview backlight with a light valve array of a multiview display further comprises illuminating 120 the light valve array using the multiview backlight to display the alignment pattern. For example, the multiview backlight may emit light as directional light beams to illuminate 120 the light valve array, e.g., as described above with respect to FIG. 1C and also FIG. 4B.

In some embodiments, the multiview backlight used to illuminate the light valve array may be substantially similar to the multiview backlight 40 of the above-described multiview display 10 illustrated in FIG. 1C. For example, the multiview backlight may comprise a light guide configured to guide light as guided light and an array of multibeam elements spaced apart from one another across the light guide. According to these embodiments, each multibeam element of the multibeam element array may be configured to scatter out a portion of the guided light from the light guide as the plurality of directional light beams having directions corresponding to the different view directions, e.g., view directions of the multiview display or of a multiview image displayed by the multiview display. In various embodiments, a size of each multibeam element is between one quarter and two times a size of a light valve of the light valve array. Further, multibeam elements of the multibeam element array may comprise one or more of a diffraction grating configured to diffractively scatter out the guided light, a micro-reflective element configured to reflectively scatter out the guided light, and a micro-refractive element configured to refractively scatter out the guided light, in some embodiments.

As illustrated in FIG. 2, the method 100 of aligning a multiview backlight with a light valve array of a multiview display further comprises adjusting 130 a relative position of the multiview backlight and the light valve array to minimize an error measure of the unit cells within the displayed alignment pattern. In particular, adjusting 130 a relative position to minimize an error measure may comprise one or both of rotating the multiview backlight relative to the light valve array and translating the multiview backlight relative to the light valve array.

In some embodiments, the error measure that is minimized may comprise a determining a relative luminance difference between each of the unit cells of the alignment pattern. For example, a luminance of each of the unit cells may be determined or measured. According to some embodiments, the relative luminance difference may then comprise a difference in luminance between corresponding view blocks of each of the unit cells of the alignment pattern. In another embodiment, the determined luminance may be an overall luminance of the unit cell, and the relative luminance difference may be determined between different ones of the unit cells of the alignment pattern, for example.

Figure 5A:
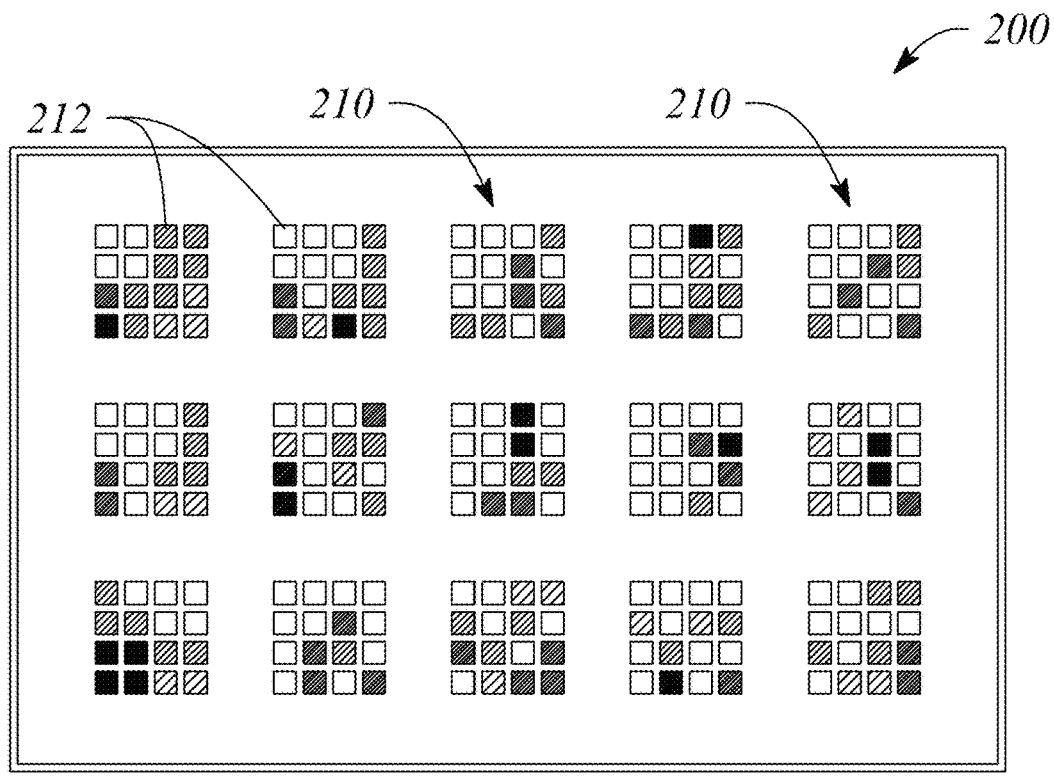
FIG. 5A illustrates a plan view of an alignment pattern of an illuminated light valve array prior to adjusting a relative position of the multiview backlight and the light valve array to minimize an error measure in an example, according to an embodiment consistent with the principles described herein.
Figure 5B:
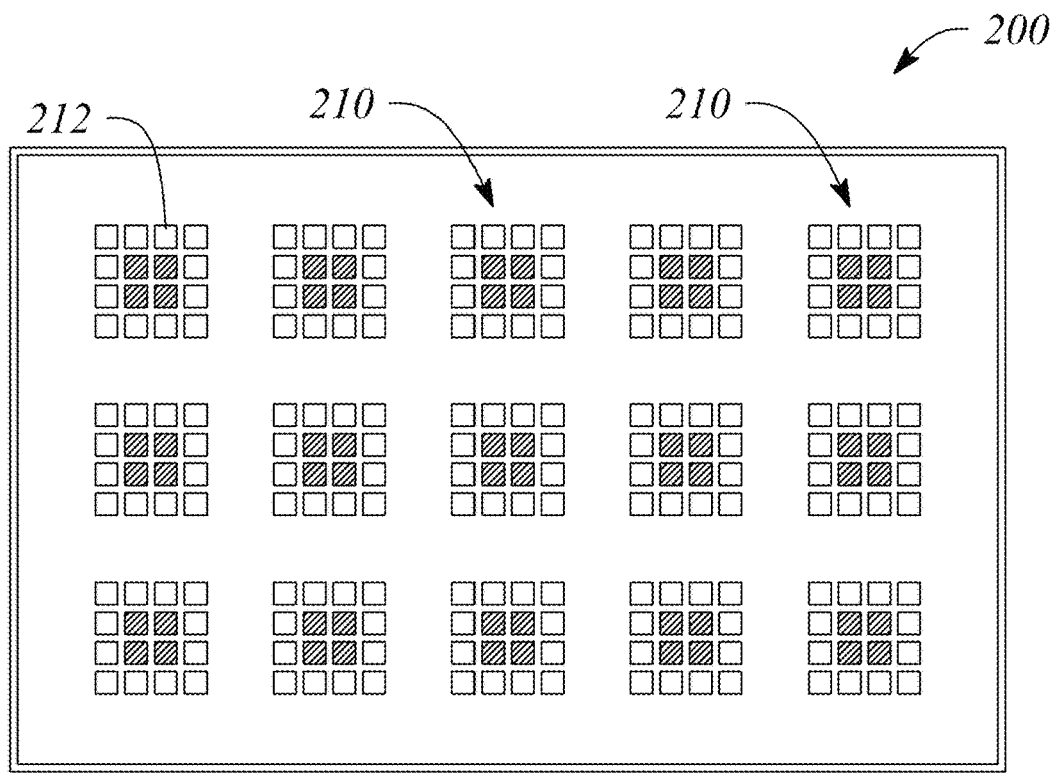
FIG. 5B illustrates a plan view of the alignment pattern of FIG. 5A following adjusting a relative position of the multiview backlight and the light valve array to minimize an error measure in an example, according to an embodiment consistent with the principles described herein.

FIG. 5A illustrates a plan view of an alignment pattern 200 of an illuminated light valve array prior to adjusting 130 a relative position of the multiview backlight and the light valve array to minimize an error measure in an example, according to an embodiment consistent with the principles described herein. FIG. 5B illustrates a plan view of the alignment pattern 200 of FIG. 5A following adjusting 130 a relative position of the multiview backlight and the light valve array to minimize an error measure in an example, according to an embodiment consistent with the principles described herein. In FIGS. 5A-5B, luminance is depicted using shading within view blocks 212 of unit cells 210 of the alignment pattern 200, where denser shading represents more luminance or a brighter view block 212. As illustrated in FIG. 5A, different unit cells 210 of the alignment pattern 200 have noticeably different luminance, especially in various view blocks 212 of the different unit cells 210. However, after adjusting 130 a relative position of the multiview backlight and the light valve array to minimize an error measure, the different unit cells 210 have much similar luminance, as illustrated in FIG. 5B. As such, the error measure represented by the relative luminance difference has been minimized as illustrated in FIG. 5B after adjusting 130.

In some embodiments, adjusting 130 a relative position to minimize an error measure comprises minimizing a location displacement of the unit cell luminance centroids in the displayed alignment pattern relative to target locations of the unit cells. That is, a centroid of the unit cell luminance for each unit cell of the alignment pattern may be measured optically or otherwise determined. Locations of the centroids of the unit cell luminance for the various unit cells of the alignment pattern may then be compared to target locations for each of the individual unit cells as the error measure to be minimized. That is, a location displacement of the unit cell luminance centroids may be employed as the error measure. In some embodiments, a location displacement of the unit cell luminance centroids comprises minimizing a sum of a squared difference between observed locations of individual unit cell luminance centroids in the displayed alignment pattern and corresponding target locations of the individual unit cells.

Figure 6:
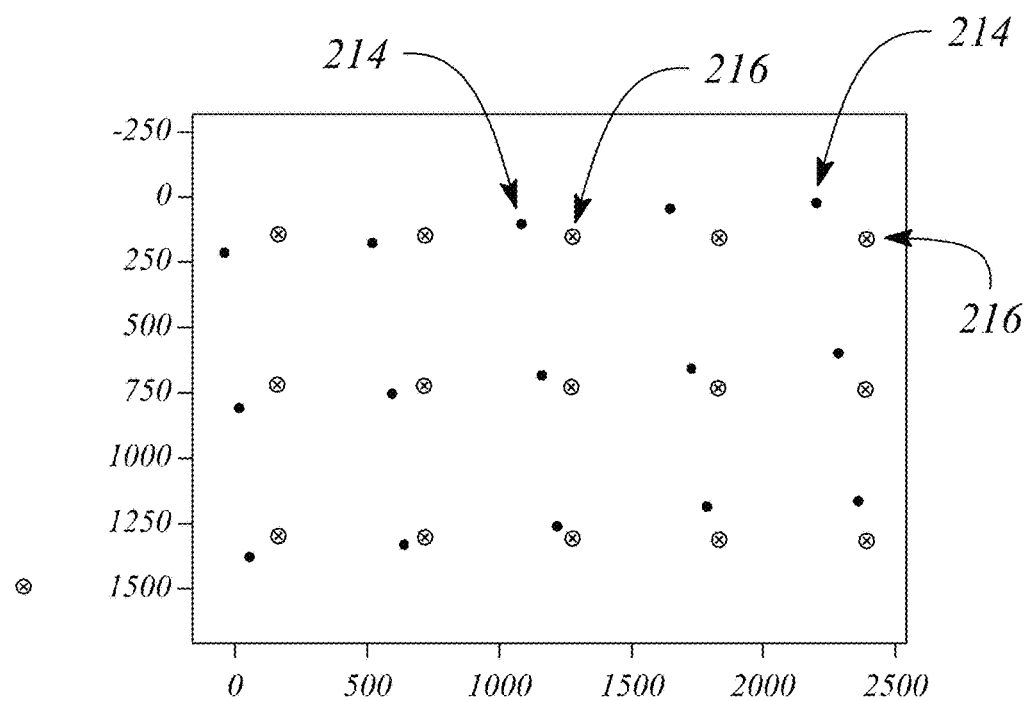
FIG. 6 illustrates a graphical representation of unit cell luminance centroids in an example, according to an embodiment consistent with the principles described herein.

FIG. 6 illustrates a graphical representation of unit cell luminance centroids 214 in an example, according to an embodiment consistent with the principles described herein. In particular, FIG. 6 illustrates a plurality of centroids 214 of unit cell luminance measured or determined for a corresponding plurality of unit cells in an alignment pattern distributed across a light valve array, e.g., the alignment pattern 200 and unit cells 210 illustrated in FIGS. 5A-5B. The unit cell luminance centroids 214 illustrated in FIG. 6 may have been determined during adjusting 130 a relative position to minimize an error measure, for example. Target locations 216 of the unit cells are also illustrated, e.g., using an 'circle-x' for each of the unit cell target locations. A location displacement of the various unit cell luminance centroids 214 relative to the target locations 216 may be minimized during adjusting 130 the relative position of the multiview backlight and the light valve array to minimize an error measure.

Figure 7:
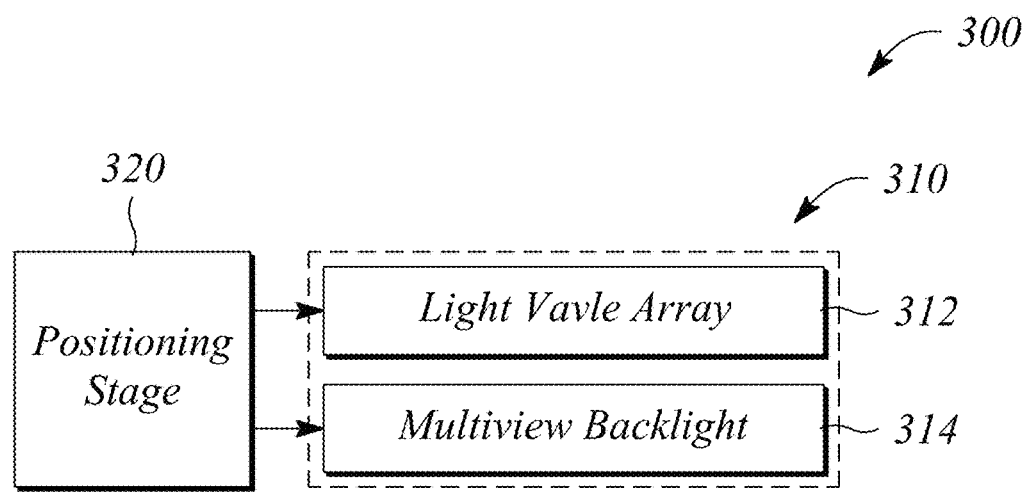
FIG. 7 illustrates a block diagram of a multiview display backlight alignment system in an example, according to an embodiment consistent with the principles described herein.

In accordance with other embodiments of the principles described herein, a multiview display backlight alignment system is provided. FIG. 7 illustrates a block diagram of a multiview display backlight alignment system 300 in an example, according to an embodiment consistent with the principles described herein. According to various embodiments, the multiview display backlight alignment system 300 may be used to facilitate manufacture of the multiview display. For example, the method of aligning may facilitate aligning an array of light valves and the multiview backlight of the multiview display, e.g., where the multiview display may be substantially similar to the multiview display 10 illustrated above by way of example in FIG. 1C.

According to various embodiments, the multiview display backlight alignment system 300 illustrated in FIG. 7 comprises a multiview display 310 having an array of light valves 312 and a multiview backlight 314. The light valve array is configured to provide a displayed alignment pattern comprising a plurality of unit cells when illuminated by the multiview backlight 314. For example, light valves 312 of the array may be driven by a display driver (not illustrated) to provide the displayed alignment pattern. Further, according to various embodiments, unit cells of the unit cell plurality are spaced apart from one another, each unit cell comprising a plurality of view blocks having different view directions corresponding to different views of the multiview display 310 or equivalently of a multiview image that is to be displayed by the multiview display 310. In addition, view blocks of the view block plurality have an arrangement within the unit cell corresponding to an arrangement of the different views. In some embodiments, the alignment pattern and plurality of unit cells may be substantially similar to the alignment pattern 200 and unit cells 210 described and employed in the method 100 of aligning a multiview backlight with a light valve array of a multiview display, as described above.

In some embodiments, the array of light valves 312 may be substantially similar to the light valve array described above. For example, the array of light valves 312 may comprise one or more of liquid crystal light valves, electrophoretic light valves, and light valves based on electrowetting.

In some embodiments, the multiview backlight 314 may be substantially similar to the multiview backlight described above with respect to the above-described method 100 of aligning a multiview backlight with a light valve array of a multiview display. For example, the multiview backlight 314 may comprise a light guide and an array of multibeam elements spaced apart from one another across the light guide. The light guide may be configured to guide light as guided light along a length of the light guide. Additionally, each multibeam elements of the multibeam element array may be configured to scatter out a portion of the guided light from the light guide as directional light beams (e.g., a plurality of directional light beams) having directions corresponding to different view directions of the views of the multiview display 310, according to various embodiments. Further, in some embodiments, a size of each multibeam element is between one quarter and two times a size of a light valve of the light valve array.

As illustrated in FIG. 7, the multiview display backlight alignment system 300 further comprises a positioning stage 320. The positioning stage 320 is configured to adjust a relative position of the array of light valve 312 and multiview backlight 314. The positioning stage 320 may physically move one or both of the light valve array and the multiview backlight 314 to adjust the relative position, for example. Further, the adjustment provided by the positioning stage 320 is configured to minimize an error measure of the unit cells within the displayed alignment pattern. According to various embodiments, substantially any positioning stage that provides adjustment of the relative position between the light valve array and the multiview backlight 314 may be employed as the positioning stage 320. For example, the positioning stage 320 may comprise a micrometer stage that provides motion in one or both of an x-axis and ay-axis. In another example, the positioning stage 320 may provide relative rotation of the light valve array and the multiview backlight 314 either instead of or in addition to one or both of motion in the x-axis and they-axis. In some embodiments, the positioning stage 320 may comprise a motorized stage configured to provide one or both of a relative rotation and a relative translation of the multiview backlight 314 and the light valve array.

In some embodiments (not illustrated in FIG. 7), the multiview display backlight alignment system 300 may further comprise a camera. The camera is configured to image the displayed alignment pattern provided on the multiview display 310. According to various embodiments, the error measure may be determined from the captured image of the displayed alignment pattern. For example, the captured image may be analyzed using a graphics processing unit (GPU) to measure luminance or determine luminance centroids as described above. Then the error measure may be produced by the GPU or another processor from the luminance measurements, for example.

Figure 8:
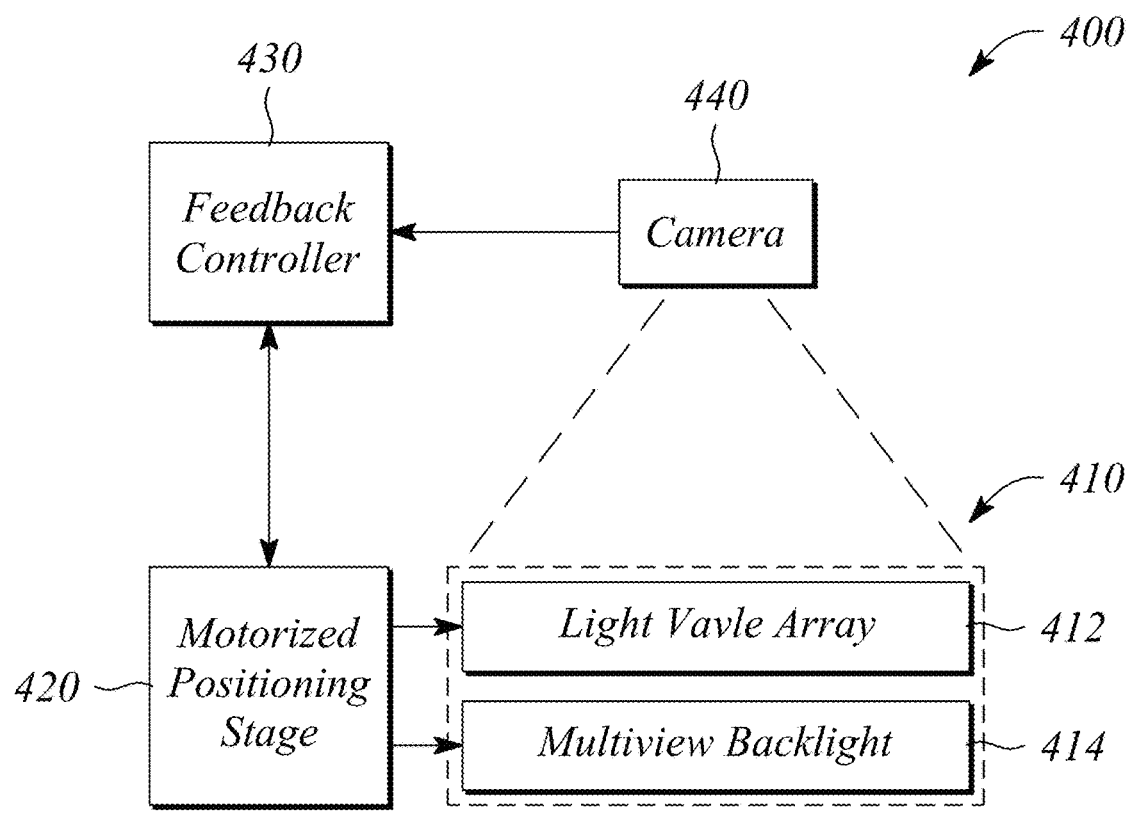
FIG. 8 illustrates a block diagram of an automated multiview display backlight alignment system in an example, according to an embodiment consistent with the principles described herein.

According to other embodiments of the principles described herein, an automated multiview display backlight alignment system is provided. FIG. 8 illustrates a block diagram of an automated multiview display backlight alignment system 400 in an example, according to an embodiment consistent with the principles described herein. As illustrated in FIG. 8, the automated multiview display backlight alignment system 400 comprises a multiview display 410 having an array of light valves 412 configured to provide a displayed alignment pattern when illuminated by a multiview backlight 414 of the multiview display 410. According to various embodiments, the alignment pattern comprises a plurality of the spaced-apart unit cells. Further, each of the spaced-apart unit cells comprises a plurality of view blocks having different view directions corresponding to different views of the multiview display. In addition, the view blocks of the spaced apart unit cells have an arrangement corresponding to an arrangement of the different views, according to various embodiments.

In some embodiments, the multiview display 410 is substantially similar to the multiview display 310 described above. Similarly, the alignment pattern including the view blocks and the unit cells may be substantially similar to the alignment pattern 200, view blocks 212, unit cells 210, also described above.

The automated multiview display backlight alignment system 400 illustrated in FIG. 8 further comprises a motorized positioning stage 420 and a feedback controller 430. The motorized positioning stage 420 is configured to adjust a relative position of the light valve array and multiview backlight of the multiview display 410. The feedback controller 430 is configured to drive the motorized positioning stage 420 to minimize an error measure of spaced-apart unit cells within the displayed alignment pattern. The feedback controller 430 may comprise a processor and a motor controller, for example.

According to some embodiments, the automated multiview display backlight alignment system 400 may further comprise a camera 440 configured to capture an image of the displayed alignment patter provided on the multiview display 410, as illustrated in FIG. 8. In these embodiments, the feedback controller 430 may be configured to determine the error measure the capture image of the displayed alignment pattern image provided by the camera 440. In some embodiments, the error measure may comprise one or both of a relative luminance difference between each of the unit cells of the alignment pattern and a location displacement of the unit cell luminance centroids in the displayed alignment pattern relative to target location of the unit cells.

Further, the feedback controller 430 may determine the relative luminance difference or the unit cell luminance centroids and then implement any of a number of different analysis techniques to determine and minimize the error measure. Below is a more detailed discussion of some of these techniques that may be implemented by a processor of the feedback controller 430 to provide error minimization, according to various embodiments.

Quantifying Alignment Using Multiview Alignment Pattern

According to various embodiments, a multiview alignment luminance pattern may have designated a plurality of unit cells that may correspond to a plurality of super-pixels of a multiview display. For example, each unit cell may have center coordinates $(x_i, y_i) \forall i \leq N$. With regard to an exemplary process for determining and minimizing an error measure, an imaging device or camera may be configured to capture images of the illuminated backlight and light valve array assembly at one or more designed viewing positions. Further, such imaging device or camera may be configured at the center of the field of view (FOV) of the backlight and light valve array assembly. From the captured image of the luminance pattern displayed, an illuminated center coordinates L(x,y) may be calculated using the camera calibration. For example, the pixel centroids $(\overline{x}_i, \overline{y}_i)$ within each of the N unit cells may be computed by equation (2) as:

$$(\overline{x}_i, \overline{y}_i) = \left( \frac{\iint xLdA}{\iint LdA}, \frac{\iint yLdA}{\iint LdA} \right), \quad (2)$$

for $x, y$ in domain of unit cell $i$

According to various embodiments, an error measure of alignment may be computed using various suitable techniques. In one embodiment, a sum squared residuals (SSR) value may be computed to evaluate the distances R between the respective centroids and the respective centers of the unit cell, or some other coordinate $(x_i, y_i)$ which is expected for the camera viewing position, e.g., by equation (3):

$$R^2 = \Sigma_1^N (\overline{y}_i - y_i)^2 + (\overline{x}_i - x_i)^2 \quad (3)$$

where $\overline{y}_i$ is a centroid coordinate along the y axis, and $y_i$ is the center coordinate of a unit cell along the y axis, $\overline{x}_i$ is a centroid coordinate along the x axis, and $x_i$ is the center coordinate of a unit cell along the x axis.

In another embodiment, given a set of centroid coordinates $(\overline{x}_i, \overline{y}_i)$ and a set of ideal or reference points $(x_i, y_i)$, a transformation matrix may be computed to minimize the SSR, e.g., by using an affine transformation, or a homography transformation. The computed transformation matrix may be decomposed into geometric transformations, which may be used by one or more processors and/or analyzing components to determine a degree of severity of the misalignment between the backlight and the light valve array.

According to some embodiments, in lieu of decomposition, rotation, translation and stretch transformations may be computed directly. In one example, homography, which is a perspective transformation that describes translation, rotation, and scaling (or stretch), may be utilized. Mathematically, a homography matrix $H_p$ may be decomposed into a $K_p$ matrix describing scaling, a $R_p$ matrix describing rotation, and a $T_p$ matrix describing translation, as follow:

$$H_p = K_p[R_p \mid T_p] \tag{4}$$

$$K_p = \begin{bmatrix} 1+s_x & 0 & 0 \\ 0 & 1+s_y & 0 \\ 0 & 0 & 1 \end{bmatrix} \tag{5}$$

$$R_p = \begin{bmatrix} r_{11} & r_{12} & r_{13} \\ r_{21} & r_{22} & r_{23} \\ r_{31} & r_{32} & r_{33} \end{bmatrix} \tag{6}$$

$$T_p = \begin{bmatrix} t_x \\ t_y \\ t_z \end{bmatrix} \tag{7}$$

where $s_x$ is a stretch factor in pixel space along the x axis, $s_y$ is a stretch factor in pixel along the y axis, R is a rotation factor in pixel space, and t is a translation factor in pixel space.

Further, for each matrix element, a pass/fail threshold value may be configured to fine tune the quality control degree in terms of the degree of alignment between the backlight and the light valve array. Here, for example, a pass/fail threshold value may be defined based on an impact on the multiview display appearance. In this way, such approach provides for a variety of corresponding/custom granularity in terms of quality control finer than using the SSR technique. Further, these parameters measured in terms of pixel unit may be converted into physical units. Based on the converted measurement in physical units, requirements may be defined in the quality control specifications.

Active Alignment of Using Multiview Alignment Pattern

According to various embodiments, the alignment of the display and the backlight may be adjusted based on the measured misalignment parameters as described above. For example, adjusting the alignment of these components may be performed as an internal process of a multiview display manufacturer. In another example, an adjustment process may also be performed at a product assembly site by an external multiview display manufacturer to ensure that the alignment between the backlight and the light valve array has not changed.

In some embodiments, a numerical optimization may be utilized to improve upon the detected misalignment between the backlight and the light valve array. Further, such optimization may be performed iteratively to improve the alignment between the backlight and the light valve array. In one exemplary iteration, an image of the multiview display is captured using a camera or light sensor. Next, a SSR value and/or one or more transformations that may minimize the computed SSR value are computed to generate a merit function. Given the merit function, various multiview backlight alignment parameters may be modified, manipulated, or otherwise updated so as to minimize a result computed by the merit function. For example, adjustments in one or more of alignment parameters such as rotation, translation, and distance to the light valve array may be performed to minimize the results of the merit functions.

In other embodiments, one or more geometric or perspective transformation that may minimize the SSR is computed. Next, the transformations may be decomposed into a set of one or more alignment parameters. For example, such transformation may be decomposed into one or more of a translation value ($t_x, t_y$ in image pixels), a rotation value ($\theta$ in plane, about optical axis in degrees), and a stretch value ($s_x, s_y$ in dimensionless units).

Converting the Pixel Calculation to Physical Unit Calculation

As described above, image analysis of the luminated alignment pattern may be used to compute alignment parameters. Those parameters computed in image pixels may be converted in physical unit so that physical adjustments can be performed to align the backlight and the light valve array. For example, to adjust the physical backlight alignment to correct translational misalignment, a translation parameter value in image pixel units need to be converted into a value in physical units.

According to various embodiments, a translation value may be converted to a value in physical unit using various techniques. For example, a size of the multiview display is typically known. Given the size of the display, units of image pixels may be converted into units of display pixels. Then, given the size of each "single view region" or view block within the unit cell (dx, dy in units of pixels), units of display pixels may be converted to units of views. In one example, such conversion may be computed by subtracting the unit cell center from the centroids as follow:

$$(\bar{v}_{x,i}, \bar{v}_{y,i}) = \frac{(\bar{x}_i, \bar{y}_i) - (x_i, y_i)}{(dx, dy)} \tag{8}$$

where $(\bar{x}_i, \bar{y}_i)$ is the coordinate value of the centorids, $(x_i, y_i)$ is the coordinate value of the center of a unit cell, and (dx,dy) is a dimension of a view block within a unit cell of the alignment pattern Further, in some embodiment, different conversions may be computed depending on different pattern designs. Once the centroids are expressed in views, these coordinate values may be converted into units of physical length based on the size and geometry of the multiview display. For every multiview display, a translation of one view in the alignment pattern image is equivalent to a translation of a length ($\Delta_{x,y}$ in units of microns). As such, a global translation $\vec{T}$ in units of microns for the display may be computed as follow:

$$\vec{T} = [t_x, t_y] \cdot \left[\frac{\Delta_x}{dx}, \frac{\Delta_y}{dy}\right] \tag{9}$$

where $[t_x, t_y]$ is translation in pixel space, $\Delta_x$ is the value of a dimension of a single view on the x-axis in microns, dx is the dimension of a view block on the x-axis in pixels, $\Delta_y$ is the value of a dimension of a single view on the y axis in microns, and dy is the dimension of a view block on the y-axis in pixels.

Similarly, the rotation may be converted to physical units. A vertical view shift caused by the rotation across the display is computed as follow:

$$dv_y = \frac{W_p \tan(\theta)}{dy} \quad (10)$$

where θ is a rotation misalignment factor, dy is the dimension of a view block on the y-axis, and $W_p$ the number of pixels along the width of the display (x-axis). Then, a new angle is computed as follow:

$$\Theta = \tan^{-1}\left(\frac{dv_y \Delta_y}{W}\right) \quad (11)$$

where $\Delta_y$ is value of a dimension of a single view on the y axis in microns, W is the display width in microns (x-axis).

Stretch ($s_x, s_y$) may be converted into a physical quantity as follows:

$$S_x = \frac{s_x W_p}{dx}\Delta_x \quad (12)$$

$$S_y = \frac{s_y H_p}{dy}\Delta_y \quad (13)$$

where $H_p$ is the number of pixels along the height of the display on the y-axis, $W_p$ is the number of pixels along the width of the display on the x-axis, $s_x$ is a stretch factor in pixel space, $s_y$ is a stretch factor in pixel space, $\Delta_x$ is value of a dimension of a single view on the x axis in microns, dx is the dimension of a view block on the x-axis in pixels, $\Delta_y$ is value of a dimension of a single view on the y axis in microns, and dy is the dimension of a view block on the y-axis in pixels. Note that the stretch can be compensated by changing the working distance between the multiview backlight and the Light valve array. For a given value of $S_x$ and $S_y$, a possible distance between the backlight and Light valve array may be computed and applied to adjust the alignment between the backlight and the LCD accordingly.

Thus, there have been described examples and embodiments of a method of aligning a multiview backlight with a light valve array along with various multiview display backlight alignment systems that provide alignment of the multiview backlight and light valve array of a multiview display. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A method of aligning a multiview backlight with a light valve array of a multiview display, the method comprising:
   establishing on the light valve array an alignment pattern having unit cells spaced apart from one another, each unit cell of the alignment pattern comprising a plurality of view blocks having different view directions corresponding to different views of the multiview display;
   illuminating the light valve array using the multiview backlight to display the alignment pattern; and
   adjusting a relative position of the multiview backlight and the light valve array to minimize an error measure of the unit cells within the displayed alignment pattern, wherein an arrangement of view blocks within each unit cell corresponds to an arrangement of the views of the multiview display.

2. The method of aligning a multiview backlight of claim 1, wherein the arrangement of views of the multiview display comprises a one-dimensional array of sequentially arranged views, each unit cell of the alignment pattern having a corresponding one-dimensional array of sequentially arranged view blocks.

3. The method of aligning a multiview backlight of claim 1, wherein the arrangement of views of the multiview display comprises a two-dimensional array of views, each unit cell of the alignment pattern having a corresponding two-dimensional array of view blocks.

4. The method of aligning a multiview backlight of claim 3, wherein the two-dimensional array of views is a two-by-two array of four views arranged in two rows and two columns.

5. The method of aligning a multiview backlight of claim 1, wherein the multiview backlight comprises:
   a light guide configured to guide light as guided light; and
   an array of multibeam elements spaced apart from one another across the light guide, each multibeam element of the multibeam element array being configured to scatter out a portion of the guided light from the light guide as a plurality of directional light beams having directions corresponding to the different view directions to illuminate the light valve array,
   wherein a size of each multibeam element is between one quarter and two times a size of a light valve of the light valve array.

6. The method of aligning a multiview backlight of claim 5, wherein multibeam elements of the multibeam element array comprise one or more of a diffraction grating configured to diffractively scatter out the guided light, a micro-reflective element configured to reflectively scatter out the guided light, and a micro-refractive element configured to refractively scatter out the guided light.

7. The method of aligning a multiview backlight of claim 1, wherein adjusting a relative position comprises one or both of rotating the multiview backlight relative to the light valve array and translating the multiview backlight relative to the light valve array.

8. The method of aligning a multiview backlight of claim 1, wherein the error measure comprises a relative luminance difference between each of the unit cells of the alignment pattern.

9. The method of aligning a multiview backlight of claim 8, wherein the relative luminance difference comprises a difference in luminance between corresponding view blocks of each of the unit cells of the alignment pattern.

10. The method of aligning a multiview backlight of claim 1, wherein adjusting a relative position to minimize an error measure comprises minimizing a location displacement of unit cell luminance centroids in the displayed alignment pattern relative to target locations of the unit cells.

11. The method of aligning a multiview backlight of claim 10, wherein minimizing a location displacement of the unit cell luminance centroids comprises minimizing a sum of a squared difference between observed locations of individual unit cell luminance centroids in the displayed alignment pattern and corresponding target locations of the individual unit cells.

12. A multiview display backlight alignment system comprising:
- a multiview display having an array of light valves and a multiview backlight, the light valve array being configured to provide a displayed alignment pattern comprising a plurality of unit cells when illuminated by the multiview backlight; and
- a positioning stage configured to adjust a relative position of the light valve array and multiview backlight to minimize an error measure of the unit cells within the displayed alignment pattern,
- wherein unit cells of the unit cell plurality are spaced apart from one another, each unit cell comprising a plurality of view blocks having different view directions corresponding to different views of the multiview display and having an arrangement corresponding to an arrangement of the different views.

13. The multiview display backlight alignment system of claim 12, further comprising a camera configured to capture an image of the displayed alignment pattern provided on the multiview display, the error measure being determined from the captured image of the displayed alignment pattern.

14. The multiview display backlight alignment system of claim 12, wherein the multiview backlight comprises:
- a light guide configured to guide light as guided light; and
- an array of multibeam elements spaced apart from one another across the light guide, each multibeam element of the multibeam element array being configured to scatter out a portion of the guided light from the light guide as directional light beams having directions corresponding to the different view directions,
- wherein a size of each multibeam element is between one quarter and two times a size of a light valve of the light valve array.

15. The multiview display backlight alignment system of claim 12, wherein the positioning stage comprises a motorized stage configured to provide one or both of a relative rotation and a relative translation of the multiview backlight and the light valve array.

16. The multiview display backlight alignment system of claim 12, wherein the error measure comprises a relative luminance difference between each of the unit cells of the displayed alignment pattern.

17. The multiview display backlight alignment system of claim 12, wherein the error measure comprises a location displacement of unit cell luminance centroids in the displayed alignment pattern relative to target location of the unit cells.

18. The multiview display backlight alignment system of claim 17, wherein minimizing the error measure comprises minimizing a sum of a squared difference between observed locations of individual unit cell luminance centroids in the displayed alignment pattern and corresponding target locations of the individual unit cells by adjusting the relative position of the light valve array and multiview backlight using the positioning stage.

19. An automated multiview display backlight alignment system comprising:
- a multiview display having an array of light valves configured to provide a displayed alignment pattern when illuminated by a multiview backlight of the multiview display;
- a motorized positioning stage configured to adjust a relative position of the light valve array and multiview backlight; and
- a feedback controller configured to drive the motorized positioning stage to minimize an error measure of spaced-apart unit cells within the displayed alignment pattern,
- wherein the alignment pattern comprises a plurality of the spaced-apart unit cells, each of the spaced-apart unit cells comprising a plurality of view blocks having different view directions corresponding to different views of the multiview display and having an arrangement corresponding to an arrangement of the different views.

20. The automated multiview display backlight alignment system of claim 19, further comprising a camera configured to capture an image of the displayed alignment pattern provided on the multiview display, the feedback controller being configured to determine the error measure of the captured image of the displayed alignment pattern provided by the camera.

21. The automated multiview display backlight alignment system of claim 19, wherein the error measure comprises one or both of a relative luminance difference between each of the unit cells of the alignment pattern and a location displacement of unit cell luminance centroids in the displayed alignment pattern relative to target location of the unit cells.

22. The automated multiview display backlight alignment system of claim 19, wherein the multiview backlight comprises:
- a light guide configured to guide light as guided light; and
- an array of multibeam elements spaced apart from one another across the light guide, each multibeam element of the multibeam element array being configured to scatter out a portion of the guided light from the light guide as a plurality of directional light beams having directions corresponding to the different view directions,
- wherein a size of each multibeam element is between one quarter and two times a size of a light valve of the light valve array, and wherein multibeam elements of the multibeam element array comprise one or more of a diffraction grating configured to diffractively scatter out the guided light, a micro-reflective element configured to reflectively scatter out the guided light, and a micro-refractive element configured to refractively scatter out the guided light.

\* \* \* \* \*